May 29, 1956     M. H. GROVE     2,747,608
REINFORCED RESILIENT SLEEVE TYPE VALVE CONSTRUCTION
Filed Oct. 28, 1950     2 Sheets-Sheet 1
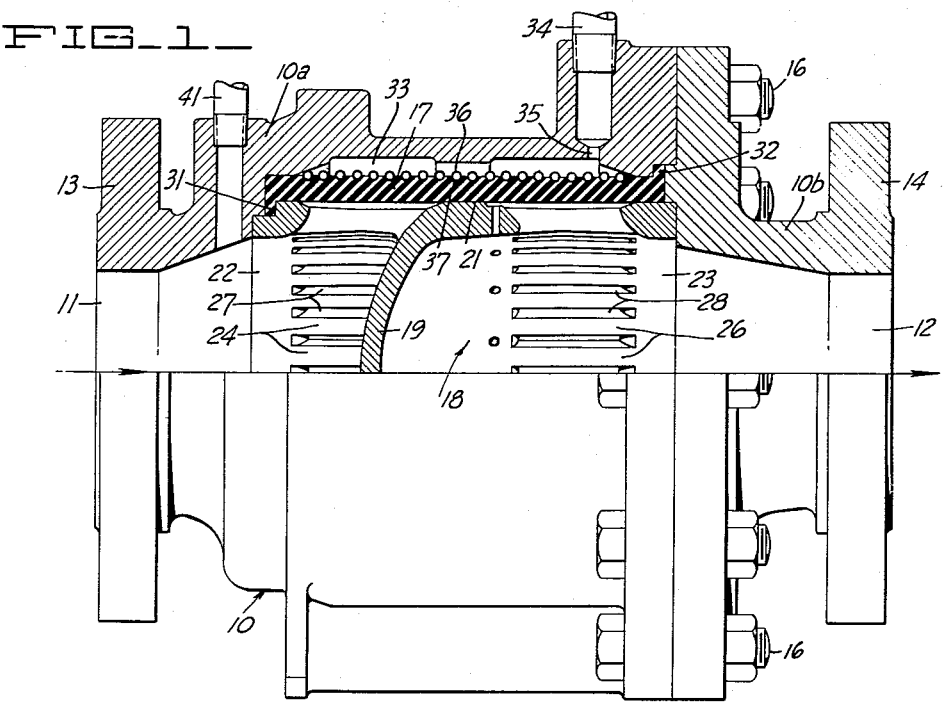
FIG_1_
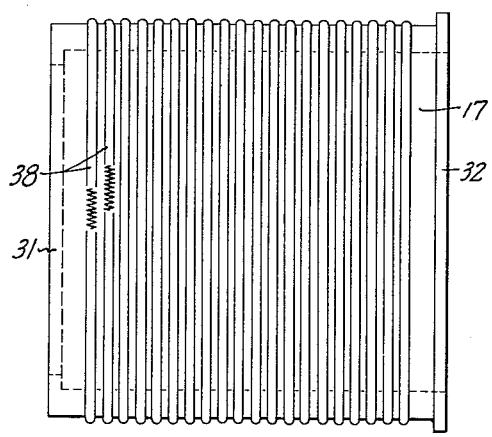
FIG_2_
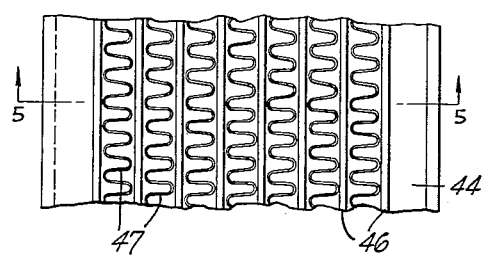
FIG_4_
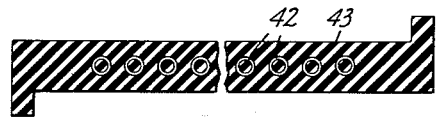
FIG_3_
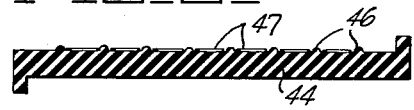
FIG_5_
FIG_6_
INVENTOR.
Marvin H. Grove
BY
ATTORNEYS May 29, 1956 M. H. GROVE 2,747,608
REINFORCED RESILIENT SLEEVE TYPE VALVE CONSTRUCTION
Filed Oct. 28, 1950 2 Sheets-Sheet 2
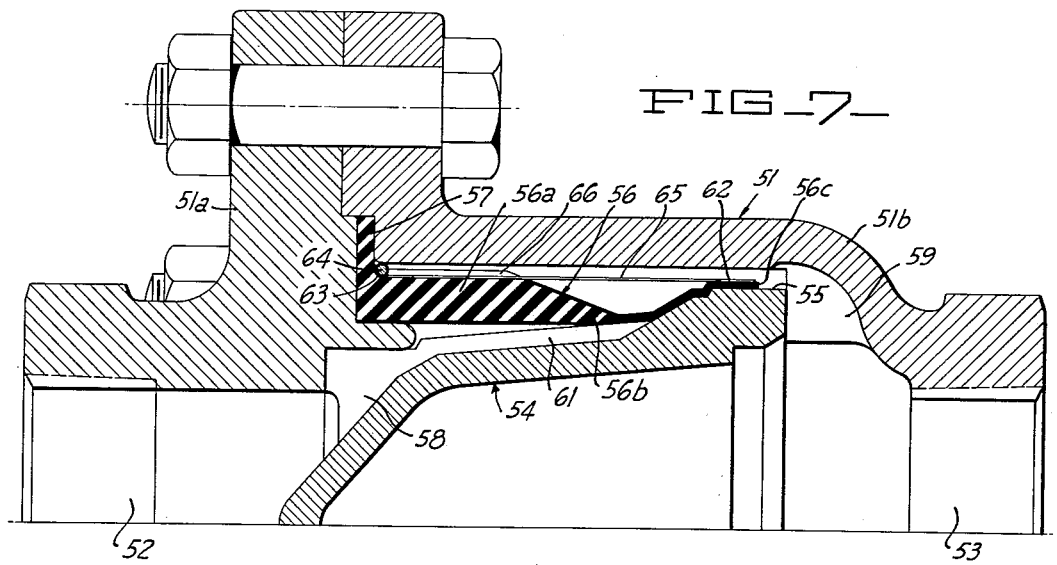
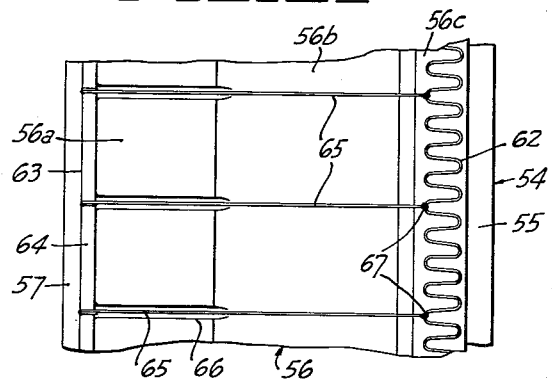
INVENTOR.
Marvin H. Grove
BY
ATTORNEYS

United States Patent Office 2,747,608
Patented May 29, 1956

2,747,608

REINFORCED RESILIENT SLEEVE TYPE VALVE CONSTRUCTION

Marvin Henry Grove, Piedmont, Calif., assignor to Grove Valve and Regulator Company, a corporation of California Application October 28, 1950, Serial No. 192,763

5 Claims. (Cl. 137—525)

This invention relates generally to valves for controlling fluid flow, and to certain component parts of the same.

In Patent 2,353,143, granted July 11, 1944, there is disclosed a valve comprising a sleeve or tube formed of resilient rubber and adapted to seal about an inner core. The body of the valve provides a closed fluid chamber about the sleeve into which fluid under pressure can be introduced to control closing and opening movements under line pressure. As factory assembled, and without application of inflow pressure, the tube is normally expanded a certain amount whereby it presses into sealed relation with the inner annular barrier. Under certain operating conditions the tube may take a permanent set so that it no longer contracts into sealing engagement with the barrier, whereby it is difficult if not impossible to obtain tight shutoff. This may be aggravated or brought about by such conditions as relatively high operating temperatures, handling of fluids or liquids which tend to impair the ability of the rubber to recover after stretch, use of the valve with long full open periods, and use of special synthetic rubbers or like synthetic materials which are of such a character that they tend to cold flow.

It is an object of the present invention to provide an improved valve construction of the above character which will largely or entirely avoid the difficulties outlined above.

Another object of the invention is to provide an improved construction of the above character having means in conjunction with the resilient expansible tube which will insure contraction of the tube into sealed relation with the barrier.

Another object of the invention is to provide an improved expansible tube construction for valves of the above character, which is applicable to a wide variety of synthetic materials.

Additional objects of the invention will appear from the following description in which the preferred embodiment has been set forth in detail in conjunction with the accompanying drawing.

Referring to the drawing:

Figure 1 is a side elevational view, in quarter section, illustrating a valve incorporating the present invention.

Figure 2 is a side elevational view of a modified expansible tube suitable for use in the valve of Figure 1.

Figure 3 is an enlarged cross-sectional detail showing another embodiment for the expansible tube.

Figure 4 is a fragmentary view of another embodiment of the tube construction.

Figure 5 is a cross-sectional detail taken along the line 5—5 of Figure 4.

Figure 6 is a cross-sectional view like Figure 5 but illustrating another embodiment of the invention.

Figure 7 is a quarter section view illustrating another form of valve incorporating the invention.

Figure 8 is a fragmentary view illustrating the expansible tube used in the valve of Figure 7, together with the spring means associated with the same.

The valve as illustrated in Figure 1 consists of a valve body 10 which is formed to provide the inlet and outlet passages 11 and 12. The ends of the body can be provided with coupling flanges 13 and 14, or can be threaded or otherwise formed to facilitate coupling to associated piping. It is desirable to form the body in two parts 10a and 10b, which are secured together by the bolts 16. Within the body there is an expansible tube 17, formed of suitable resilient rubber, which is disposed about the inner core 18. The core 18 can be formed generally as illustrated in said Patent 2,353,143. Thus it consists of a barrier 19 which serves to provide the peripheral sealing surface 21. The barrier is connected to annular end portions 22 and 23, by the ribs or bars 24 and 26. These ribs or bars are spaced apart to form slots 27, 28 for flow of fluid.

In that form of the invention illustrated in Figure 1 the resilient tube 17 has its end portions formed with flanges 31 and 32. Flange 31 is clamped between the core portion 22 and the adjacent portion of the body section 10a. Flange 32 is clamped between the body sections 10a and 10b. With this arrangement the ends of the expansible rubber are sealed with respect to the body.

The section 10a of the body is formed to provide the chamber or space 33 which extends about the expansible tube, and which is adapted to receive fluid under pressure. This space is shown connected to the pipe 34 through the orifice 35.

In conjunction with the resilient tube 17, I provide metallic spring means tending to urge the tube into contracted and sealed relationship with the peripheral surface 21 of the barrier. The spring means illustrated in Figure 1 consists of a coiled spring wire 36 which is wound helically about the exterior of the tube as shown in Figure 2. While it is possible to wrap the coiled wire about the tube in close juxtaposition, it is desirable to maintain a spacing between each convolution by providing the exterior of the tube with a helicoidal groove 37. The coiled wire is applied within the groove 37, with the terminals suitably anchored, and with tension being applied in the wrapping operation whereby the convolutions apply inwardly directed force upon the tube walls.

Instead of providing a helicoidal groove in the tube, a series of spaced circular grooves can be provided as shown in Figure 2, and a plurality of separate coiled spring wires 38 disposed in the individual grooves to apply inwardly directed force.

With the construction shown in either Figure 1 or Figure 2, the spring means at all times applies inwardly directed force to the walls of the tube 17, thus supplementing the natural tension of the rubber walls and tending to urge the tube into sealing engagement with the peripheral sealing surface 21.

When operating a valve of this character pipe 34 is connected to a source of controlling pressure through a suitable remote pilot valve. The controlling pressure may be taken from a pipe connection 41 with the inlet passage 12 of the valve. Assuming that inlet pressure is applied to the chamber 33, the tube 17 remains in sealed relation with the peripheral sealing surface 21 of the barrier 19. However when the pilot valve is operated to vent fluid from the chamber 33, inlet pressure applied to the passage 11 serves to expand the tube 17 and thus permit flow around the barrier 19. Due to the continual action of the metal spring means, proper sealing of the tube against the peripheral sealing surface 21 is not dependent upon the recovery characteristics of the resilient rubber, and therefore the valve can be used under adverse conditions, whereby a simple rubber tube such as shown in said Patent 2,353,143 might take a permanent set and fail to properly shut off. Also with the present construction it is possible to use synthetic rubbers or like materials which may have desirable characteristics in resisting certain types of chemicals, but which may be seriously subject to cold flow.

Instead of applying the spring means to the exterior of the resilient tube, it is possible to form a bond between these parts as illustrated in Figure 3. Thus in this instance a plurality of coiled spring wires 42 are embedded in the wall of the rubber tube 43. Preferably tension is applied to the springs whereby they normally apply inwardly directed force.

In place of coiled spring wires it is possible to use spring means comprising wire bent into zig-zag form as illustrated in Figure 4. In this instance the resilient rubber tube 44 is provided with a series of longitudinally spaced ribs 46, between which are disposed the spring wires 47. It will be noted that the wires are bent to zig-zag form, and as applied to the tube they are normally tensioned to apply inwardly directed force. The ribs 46 serve to prevent longitudinal displacement of the spring wires during flexing movements of the tube.

Another embodiment of the invention is illustrated in Figure 6. In this instance a metal spring 48, formed of spring wire bent to zig-zag form, is embedded in the middle portion of the resilient rubber tube 49. When installed in the valve of Figure 1 the metal spring 48 generally embraces the peripheral sealing surface 21, thus continuously applying inwardly directed force to insure complete collapsing of the tube under shutoff conditions.

The valve of Figure 1 is particularly adapted for remote operation, and as previously mentioned the remote operation may serve to open and close the valve. It is also possible to use such a valve with diaphragm or piston operated pilot means to provide automatic pressure reduction or back pressure regulation. In addition it is possible to use such a valve for pressure relief, by applying a substantially constant fluid pressure to the chamber 33.

As illustrated in Figures 7 and 8 it is possible to apply the invention to a valve making use of an expansible rubber tube, but which is particularly adapted for use as a check valve to prevent back flow through a piping system. Such a valve is illustrated for example in Patent No. 2,621,889. Thus the valve can consist of a body 51 formed of the two sections 51a, 51b. The body provides inflow and outflow passages 52 and 53, and within the body there is a core 54 about which flow must occur. A resilient rubber tube 56 embraces the core 54, and its one end is provided with a flange 57 which is clamped between the two body sections.

The tube 56 is provided with a relatively thick wall portion 56a, a tapered wall portion 56b and a relatively thin pliable wall portion 56c, all as disclosed in the aforesaid patent. The thin wall portion is normally contracted upon a peripheral sealing surface 55, which is formed upon the core 54. The core is provided with spaced lugs 58 which seat upon the body section 51a, and the other end of the core is engaged by the spaced lugs 59 which are carried by the body section 51b. In addition a peripheral portion of the core (to the left of the sealing surface 55 as viewed in Figure 7) is provided with circumferentially spaced ribs 61.

In conjunction with the resilient rubber tube 56 I provide spring means in the form of a zig-zag spring wire 62 which surrounds the thin wall portion 56c substantially as illustrated. If special retaining means were not employed, such a spring would be displaced from the tube toward the right as viewed in Figure 7, upon expansion of the tube by applied fluid pressure. As special retaining means the resilient tube is provided with a groove 63 to accommodate the ring-shaped metal rod or wire 64. Spring wires 65 are attached to the rod at circumferentially spaced points, and extend through grooves 66 for attachment at 67 to the wire spring 62.

The arrangement illustrated in Figures 7 and 8 operates in substantially the same manner as the embodiments previously described with reference to Figures 1 to 6 inclusive. The zig-zag wire spring 62 continuously applies inwardly directed force upon the thin wall portion 56c of the rubber tube, thus continuously urging the same toward sealing engagement with the peripheral sealing surface 55. When inlet pressure is applied the tube is expanded to permit flow through the tube and about the core. Under such conditions the wire spring 62 is expanded but retains its general position about the rubber tube. Under conditions of substantially equalized inlet and outlet pressures, pliable tube portion 56c is evenly pressed against the peripheral sealing surface 57 by the spring wire 62.

I claim:

1. In a valve construction, a body having inflow and outflow passages, a core within the body forming a flow barrier between the inflow and outflow passages, the barrier having a peripheral sealing surface, a resilient tube surrounding the core, said tube having one end portion of the same sealed to the body and having its other end portion disposed to surround the barrier, the interior of the tube being exposed to the inflow passage and the exterior of the tube being exposed to the outflow passage, a metal spring disposed about said other end of the tube and serving to urge the tube into sealing engagement with said peripheral sealing surface, said spring being uniformly yieldable in the direction of its length about the circumference of the tube, and means serving to retain said spring against displacement from the tube.

2. A valve construction as in claim 1 in which said last means comprises members extending longitudinally of the tube and anchored to said one end of the same.

3. In a valve construction, a body having inflow and outflow passages, a core within the body forming a flow barrier between the inflow and outflow passages, said barrier having a peripheral sealing surface, a tube formed of resilient material disposed within the body and surrounding the barrier, said tube having an annular wall portion adapted to normally contract into sealing engagement with the barrier to arrest flow of fluid through the body, and spring means generally embracing the barrier and continuously applying inwardly directed force to said annular wall portion of the tube to urge the same into sealing engagement with the barrier, said spring means being in the form of a wire spring wrapped circumferentially about the tube and uniformly yieldable in the direction of its length about the circumference of the tube.

4. A valve construction as in claim 3 in which the spring means is a spring wire bent to zig-zag form and wrapped about the tube.

5. A valve construction as in claim 3 in which both ends of the tube are sealed with respect to the body and said wall portion is intermediate the ends of the tube.

References Cited in the file of this patent

UNITED STATES PATENTS

| | | |
|---|---|---|
| 156,908 | Brock | Nov. 17, 1874 |
| 167,604 | Chisholm | Sept. 14, 1875 |
| 456,028 | Foster | July 14, 1891 |
| 512,832 | Layden | Jan. 16, 1894 |
| 1,199,847 | Wilkins | Oct. 3, 1916 |
| 1,368,315 | Whgodsky | Feb. 15, 1921 |
| 1,413,568 | Bjornstad | Apr. 25, 1922 |
| 1,730,150 | Keith | Oct. 1, 1929 |
| 2,283,835 | Weaver | May 19, 1942 |
| 2,353,143 | Bryant | July 11, 1944 |
| 2,382,427 | Langdon | Aug. 14, 1945 |
| 2,608,204 | Dunn | Aug. 26, 1952 |
| 2,621,889 | Annin | Dec. 16, 1952 |

FOREIGN PATENTS

| | | |
|---|---|---|
| 218,988 | Germany | Feb. 14, 1910 |
| 333,276 | Germany | Feb. 21, 1921 |
| 336,530 | Germany | May 4, 1921 |